United States Patent
Armangau et al.

(10) Patent No.: US 12,118,408 B2
(45) Date of Patent: Oct. 15, 2024

(54) TECHNIQUES FOR WORKLOAD BALANCING USING DYNAMIC PATH STATE MODIFICATIONS

(71) Applicant: EMC IP Holding Company LLC, Hopkinton, MA (US)

(72) Inventors: Philippe Armangau, Acton, MA (US); Anton Kucherov, Dudley, MA (US); Vamsi K. Vankamamidi, Hopkinton, MA (US); Vasu Subramanian, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 585 days.

(21) Appl. No.: 17/137,988

(22) Filed: Dec. 30, 2020

(65) Prior Publication Data
US 2022/0206871 A1    Jun. 30, 2022

(51) Int. Cl.
*G06F 9/50* (2006.01)
*G06F 3/06* (2006.01)

(52) U.S. Cl.
CPC .......... *G06F 9/5083* (2013.01); *G06F 3/0611* (2013.01); *G06F 3/0635* (2013.01);
(Continued)

(58) Field of Classification Search
CPC .... G06F 9/5083; G06F 3/0611; G06F 3/0635; G06F 3/0659; G06F 3/067; G06F 9/5016; G06F 9/5027; G06F 2209/508
See application file for complete search history.

(56) References Cited

U.S. PATENT DOCUMENTS

| 6,378,039 B1 * | 4/2002 | Obara | G06F 3/0601 |
| | | | 711/114 |
| 6,393,535 B1 * | 5/2002 | Burton | G06F 11/2092 |
| | | | 711/158 |

(Continued)

FOREIGN PATENT DOCUMENTS

| CN | 106 873 907 A1 | 6/2017 | |
| CN | 106873907 A * | 6/2017 | ............. G06F 3/061 |

OTHER PUBLICATIONS

CN 106873907A EPO English translation (Year: 2017).*
(Continued)

*Primary Examiner* — Meng Ai T An
*Assistant Examiner* — Willy W Huaracha
(74) *Attorney, Agent, or Firm* — Muirhead and Saturnelli, LLC

(57) ABSTRACT

Rebalancing the workload of logical devices across multiple nodes may include dynamically modifying preferred paths for one or more logical devices in order to rebalance the I/O workload of the logical devices among the nodes of the data storage system. Determining whether to rebalance the I/O workload between the two nodes may be performed in accordance with one or more criteria. Processing may include monitoring the current workloads of both nodes over time and periodically evaluating, in accordance with the one or more criteria, whether the current workloads of the nodes are imbalanced. Responsive to determining, in accordance with the criteria, that rebalancing of workload between the nodes is needed, the rebalancing may be performed. A notification may be sent to the host regarding any path state changes made as a result of the workload rebalancing.

14 Claims, 5 Drawing Sheets

(52) U.S. Cl.
CPC ............ *G06F 3/0659* (2013.01); *G06F 3/067* (2013.01); *G06F 9/5016* (2013.01); *G06F 9/5027* (2013.01); *G06F 2209/508* (2013.01)

(56) References Cited

U.S. PATENT DOCUMENTS

| | | | |
|---|---|---|---|
| 9,176,902 B1* | 11/2015 | Long | G06F 3/0635 |
| 10,007,455 B1* | 6/2018 | George | G06F 3/0604 |
| 2008/0086618 A1 | 4/2008 | Qi et al. | |
| 2011/0072208 A1* | 3/2011 | Gulati | G06F 3/067 |
| | | | 711/E12.001 |
| 2015/0134920 A1* | 5/2015 | Anderson | G06F 3/0635 |
| | | | 711/154 |
| 2018/0097874 A1* | 4/2018 | Sampathkumar | H04L 41/0897 |
| 2022/0237091 A1* | 7/2022 | Nuthakki | G06F 11/3409 |
| 2023/0164080 A1* | 5/2023 | Du | H04L 47/125 |
| | | | 370/230.1 |

OTHER PUBLICATIONS

Shaul Dar, et al., U.S. Appl. No. 17/154,191, "Techniques for Workload Balancing," filed Jan. 21, 2021.

PCT Application No. PCT/US2021/029338, Filed Apr. 27, 2021, International Search Report, Dated Oct. 11, 2021.

PCT Application No. PCT/US2021/029338, Filed Apr. 27, 2021, International Preliminary Report on Patentability, Dated Jul. 13, 2023.

* cited by examiner

TECHNIQUES FOR WORKLOAD BALANCING USING DYNAMIC PATH STATE MODIFICATIONS

BACKGROUND

Technical Field

This application generally relates to data storage.

Description of Related Art

Systems may include different resources used by one or more host processors. The resources and the host processors in the system may be interconnected by one or more communication connections, such as network connections. These resources may include data storage devices such as those included in data storage systems. The data storage systems may be coupled to one or more host processors and provide storage services to each host processor. Multiple data storage systems from one or more different vendors may be connected and may provide common data storage for the one or more host processors.

A host may perform a variety of data processing tasks and operations using the data storage system. For example, a host may issue I/O operations, such as data read and write operations, received at a data storage system. The host systems may store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device may also be provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

Various embodiments of the techniques herein may include a method, a system and a computer readable medium for determining path states comprising: determining first path state information for a first group of logical devices, wherein the first path state information indicates that a first set of paths from a host to a first target port group of a first node in a data storage system are preferred paths for the first group of logical devices and wherein the first path state information indicates that a second set of paths from the host to a second target port group of a second node of the data storage system are non-preferred paths for the first group of logical devices; determining second path state information for a second group of logical devices, wherein the second path state information indicates that the first set of paths from the host to the first target port group of the first node in a data storage system are non-preferred paths for the second group of logical devices and wherein the second path state information indicates that the second set of paths from the host to the second target port group of the second node of the data storage system are preferred paths for the second group of logical devices; measuring a first workload of the first node and a second workload of the second node; determining, in accordance with one or more criteria, the first workload of the first node and the second workload of the second node, to perform load rebalancing for the first node and the second node, wherein said load rebalancing includes dynamically changing one or more preferred paths for one or more logical devices of the first group of logical devices from the first node to the second node; and performing said load rebalancing. The first workload and the second workload may each include one or more metrics regarding per node resource utilization. The one or more metrics may include one or more of: CPU utilization, memory utilization, cache utilization, back-end access time or back-end I/O rate in connection with accessing data stored on back-end non-volatile storage of the data storage system, average I/O response time, offload processing, and resource utilizations for data services.

In at least one embodiment, determining to perform load rebalancing for the first node and the second node, may include determining that a first trigger condition of the criteria is met where a first resource utilization denoted by the first workload of the first node exceeds a second resource utilization denoted by the second workload of the second node by at least a specified amount, and wherein the first resource utilization exceeds a specified minimum threshold. Performing load rebalancing may include: selecting a first logical device of the first group; modifying a current state for the first set of paths to the host for the first logical device from preferred to non-preferred; and modifying a current state for the second set of paths to the host for the first logical device from non-preferred to preferred. The first logical device selected may have a highest current I/O workload of all logical devices of the first group. Responsive to performing said load rebalancing, a notification may be sent from the data storage system to the host. The notification may include information identifying the one or more preferred paths changed from the first node to the second node for the one or more logical devices. The notification may identify a first modification of a current state for the first logical device for the first set of paths to the host from preferred to non-preferred. The notification may identify a second modification of a current state for the first logical device for the second set of paths to the host from non-preferred to preferred.

In at least on embodiment, processing may include receiving, by the host, the first path information and the second path information, wherein a multipath driver on the host uses the first path information and the second path information to select a path for sending I/O operations to logical devices of the first group and the second group. The multipath driver may send a first I/O operation directed to a first logical device over a first path between the host and the data storage system, wherein the first path may be one of the first set of paths indicated as a preferred path for the first logical device. Processing may include determining by the multipath driver that no preferred path between the host and the data storage system for the first logical device is active; and responsive to determining that no preferred path between the host and the data storage system for the first logical device is active, sending a second I/O operation to the first logical device over a second path between the host and the data storage system, where the second path is indicated in the first path state information as a non-preferred path between the host and the data storage system for the first logical device. The first group of logical devices and the second group of logical devices may be included in a collective group, and processing may include initially partitioning the collective group of logical devices into the first group and the second group.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
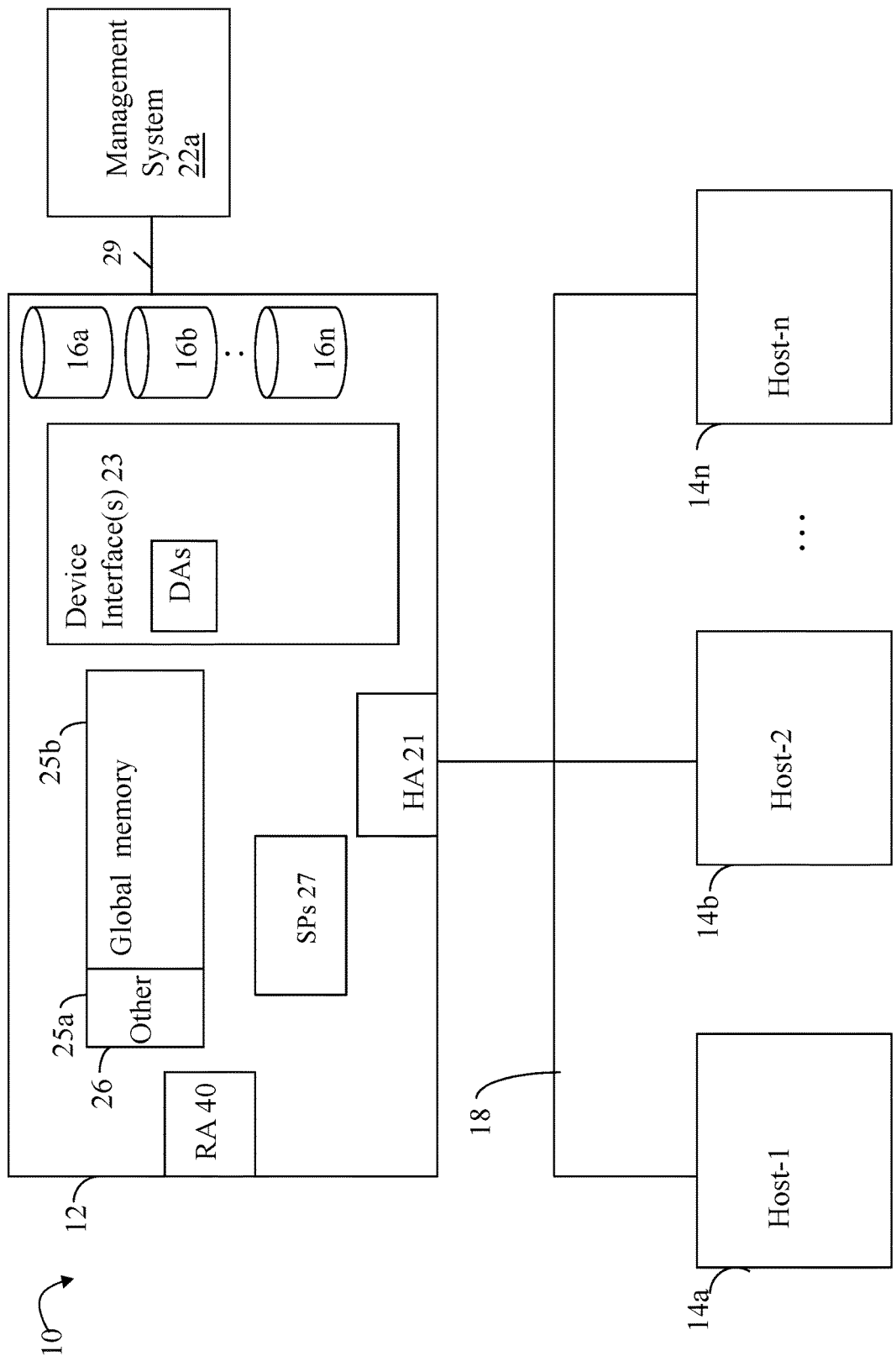
FIG. 1 is an example of components that may be included in a system in accordance with the techniques described herein.

Referring to the FIG. 1, shown is an example of an embodiment of a system 10 that may be used in connection with performing the techniques described herein. The system 10 includes a data storage system 12 connected to the host systems (also sometimes referred to as hosts) 14a-14n through the communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host systems 14a-14n and data storage system 12 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the hosts 14a-14n and the data storage system 12 may all be located at the same physical site, or, alternatively, may also be located in different physical locations. The communication medium 18 used for communication between the host systems 14a-14n and the data storage system 12 of the system 10 may use a variety of different communication protocols such as block-based protocols (e.g., SCSI, Fibre Channel, iSCSI), file system-based protocols (e.g., NFS or network file server), and the like. Some or all of the connections by which the hosts 14a-14n and the data storage system 12 may be connected to the communication medium 18 may pass through other communication devices, such as switching equipment, a phone line, a repeater, a multiplexer or even a satellite.

Each of the host systems 14a-14n may perform data operations. In the embodiment of the FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although the element 12 is illustrated as a single data storage system, such as a single data storage array, the element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrating the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSDs may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of controllers, adapters or directors, such as an HA 21 (host adapter), RA 40 (remote adapter), and/or device interface(s) 23. Each of the adapters (sometimes also known as controllers, directors or interface components) may be implemented using hardware including a processor with a local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from one of the hosts 14a-n. The data storage array may include one or more RAs that may be used, for example, to facilitate communications between data storage arrays. The data storage array may also include one or more device interfaces 23 for facilitating data transfers to/from the data storage devices 16a-16n. The data storage device interfaces 23 may include device interface modules, for example, one or more disk adapters (DAs) (e.g., disk controllers) for interfacing with the flash drives or other physical storage devices (e.g., PDS 16a-n). The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, the HAs and/or the RAs in a data storage array. In one embodiment, the device interfaces 23 may perform data operations using a system cache that may be included in the global memory 25b, for example, when communicating with other device interfaces and other components of the data storage array. The other portion 25a is that portion of the memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

The host systems 14a-14n provide data and access control information through channels to the storage systems 12, and the storage systems 12 may also provide data to the host systems 14a-n also through the channels. The host systems 14a-n do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may include one or more type of device interface used in connection with facilitating data transfers to/from the associated disk drive(s) and LUN (s) residing thereon. For example, such device interfaces may include a device interface used in connection with facilitating data transfers to/from the associated flash devices and LUN(s) residing thereon. It should be noted that an embodiment may use the same or a different device interface for one or more different types of devices than as described herein.

In an embodiment in accordance with the techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of the techniques herein may be made with respect to a physical data storage system and its physical components (e.g., physical hardware for each HA, DA, HA port and the like), the techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a that may be used to manage and monitor the data storage system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Information regarding the data storage system configuration may be stored in any suitable data container, such as a database. The data storage system configuration information stored in the database may generally describe the various physical and logical entities in the current data storage system configuration. The data storage system configuration information may describe, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, local replication configurations and details of existing local replicas (e.g., a schedule or other trigger conditions of when a snapshot is taken of one or more LUNs, identify information regarding existing snapshots for a particular LUN), remote replication configurations (e.g., for a particular LUN on the local data storage system, identify the LUN's corresponding remote counterpart LUN and the remote data storage system on which the remote LUN is located), data storage system performance information such as regarding various storage objects and other entities in the system, and the like.

Consistent with other discussion herein, management commands issued over the control or data path may include commands that query or read selected portions of the data storage system configuration, such as information regarding the properties or attributes of one or more LUNs. The management commands may also include commands that write, update, or modify the data storage system configuration, such as, for example, to create or provision a new LUN (e.g., which may result in modifying one or more database tables such as to add information for the new LUN), to modify an existing replication schedule or configuration (e.g., which may result in updating existing information in one or more database tables for the current replication schedule or configuration), to delete a LUN (e.g., which may include deleting the LUN from a table of defined LUNs and may also include modifying one or more other database tables to delete any existing snapshots of the LUN being deleted), and the like.

It should be noted that each of the different adapters, such as each HA, DA, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of the FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, the memory 26 may represent memory of each such storage processor.

Generally, the techniques herein may be used in connection with any suitable storage system, appliance, device, and the like, in which data is stored. For example, an embodiment may implement the techniques herein using a midrange data storage system, such as a Dell EMC Unity® data storage system or a Dell EMC PowerStore® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on management system 22a to the data storage system 12. Such commands may be, for example, to establish or modify data services, provision storage, perform user account management, and the like. Consistent with other discussion herein, the management commands may result in processing that includes reading and/or modifying information in the database storing data storage system configuration information. For example, management commands that read and/or modify the data storage system configuration information in the database may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to the FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
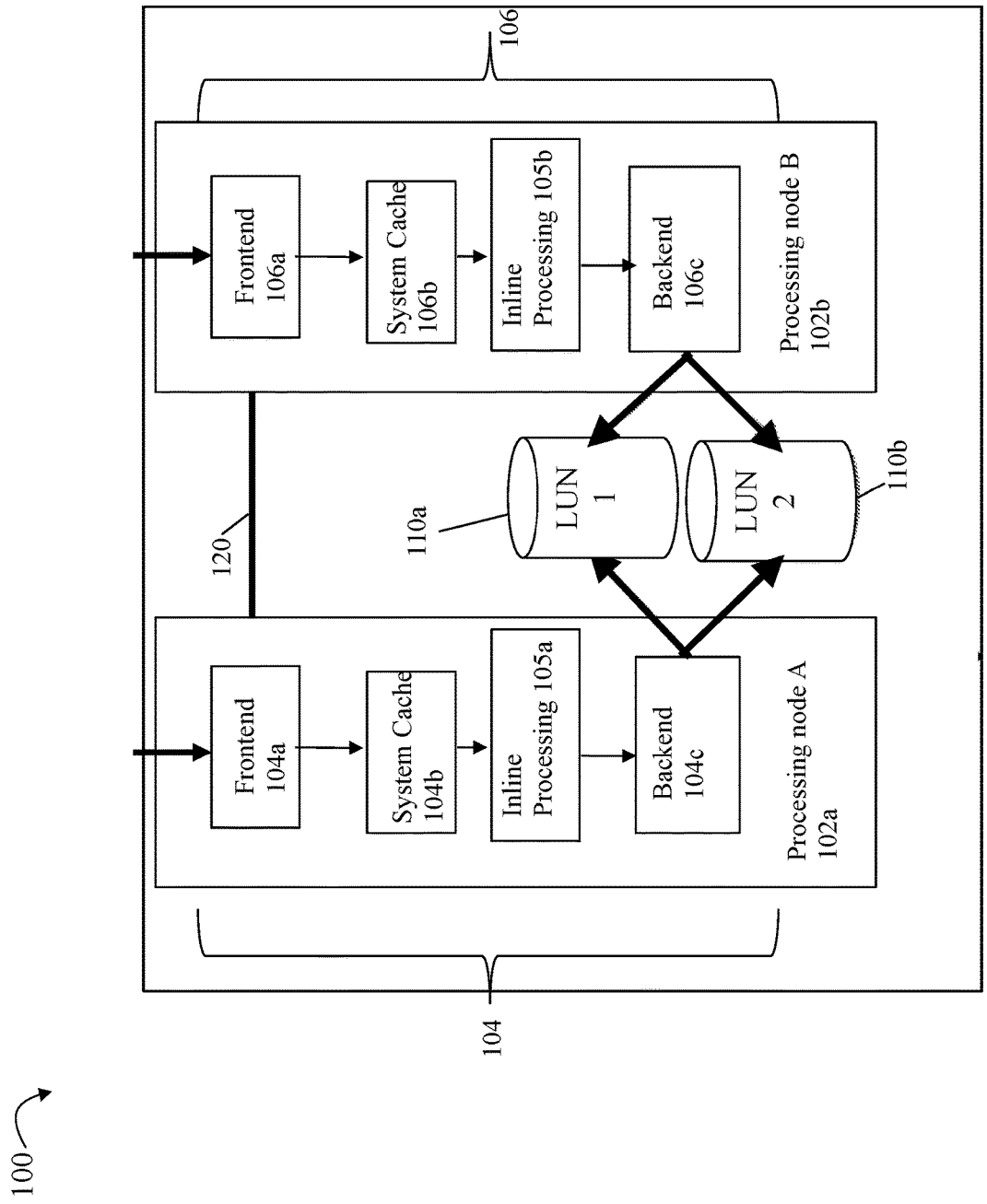
FIG. 2 is an example illustrating the I/O path or data path in connection with processing data in an embodiment in accordance with the techniques herein.

With reference to the FIG. 2, shown is an example 100 illustrating components that may be included in the data path in at least one existing data storage system in accordance with the techniques herein. The example 100 includes two processing nodes A 102a and B 102b and the associated software stacks 104, 106 of the data path, where I/O requests may be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing may be performed by layer 105a. Such inline processing operations of 105a may be optionally performed and may include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing may include, for example, performing one or more data reduction operations such as data duplication or data compression. The inline processing may include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O may be directed to a location or logical address of a LUN and where data may be read from, or written to, the logical address. The LUNs 110a, 110b are examples of storage objects representing logical storage entities included in an existing data storage system configuration. Since, in this example, writes directed to the LUNs 110a, 110b may be received for processing by either of the nodes 102a and 102b, the example 100 illustrates what may also be referred to as an active-active configuration.

In connection with a write operation as may be received from a host and processed by the processing node A 102a, the write data may be written to the system cache 104b, marked as write pending (WP) denoting it needs to be written to the physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations may be performed. For example, the inline processing may include performing data compression processing, data deduplication processing, and the like, that may convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b may be stored in a modified form where processing is performed by 105a to restore or convert the modified form of the data to its original data form prior to returning the requested read data to the host.

Also illustrated in FIG. 2 is an internal network interconnect 120 between the nodes 102a, 102b. In at least one embodiment, the interconnect 120 may be used for internode communication between the nodes 102a, 102b.

In connection with at least one embodiment in accordance with the techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. The processor cache may be substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage. For example, in at least one embodiment, a RAM based memory may be one of the caching layers used as to cache the write data that is then flushed to the backend physical storage. When the processor performs processing, such as in connection with the inline processing 105a, 105b as noted above, data may be loaded from the main memory and/or other lower cache levels into its CPU cache.

In at least one embodiment, the data storage system may be configured to include one or more pairs of nodes, where each pair of nodes may be generally as described and represented as the nodes 102a-b in the FIG. 2. For example, a data storage system may be configured to include at least one pair of nodes and at most a maximum number of node pairs, such as for example, a maximum of 4 node pairs. The maximum number of node pairs may vary with embodiment. In at least one embodiment, a base enclosure may include the minimum single pair of nodes and up to a specified maximum number of PDs. In some embodiments, a single base enclosure may be scaled up to have additional BE non-volatile storage using one or more expansion enclosures, where each expansion enclosure may include a number of additional PDs. Further, in some embodiments, multiple base enclosures may be grouped together in a load-balancing cluster to provide up to the maximum number of node pairs. Consistent with other discussion herein, each node may include one or more processors and memory. In at least one embodiment, each node may include two multi-core processors with each processor of the node having a core count of between 8 and 28 cores. In at least one embodiment, the PDs may all be non-volatile SSDs, such as flash-based storage devices and storage class memory (SCM) devices. It should be noted that the two nodes configured as a pair may also sometimes be referred to as peer nodes. For example, the node A 102a is the peer node of the node B 102b, and the node B 102b is the peer node of the node A 102a.

In at least one embodiment, the data storage system may be configured to provide both block and file storage services with a system software stack that includes an operating system running directly on the processors of the nodes of the system.

In at least one embodiment, the data storage system may be configured to provide block-only storage services (e.g., no file storage services). A hypervisor may be installed on each of the nodes to provide a virtualized environment of virtual machines (VMs). The system software stack may execute in the virtualized environment deployed on the hypervisor. The system software stack (sometimes referred to as the software stack or stack) may include an operating system running in the context of a VM of the virtualized environment. Additional software components may be included in the system software stack and may also execute in the context of a VM of the virtualized environment.

In at least one embodiment, each pair of nodes may be configured in an active-active configuration as described elsewhere herein, such as in connection with FIG. 2, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes may not be shared with other pairs of nodes. A host may access data stored on a BE PD through the node pair associated with or attached to the PD.

In at least one embodiment, each pair of nodes provides a dual node architecture where both nodes of the pair may be identical in terms of hardware and software for redundancy and high availability. Consistent with other discussion herein, each node of a pair may perform processing of the different components (e.g., FA, DA, and the like) in the data path or I/O path as well as the control or management path. Thus, in such an embodiment, different components, such as the FA, DA and the like of FIG. 1, may denote logical or functional components implemented by the one or more processors of each node. Each node of the pair may include its own resources such as its own processors, memory, cache and the like.

In an embodiment described herein, the data storage systems may be a SCSI-based system such as SCSI-based data storage array. An embodiment in accordance with the techniques herein may include hosts and data storage systems which operate in accordance with the standard SCSI Asymmetrical Logical Unit Access (ALUA). The ALUA standard specifies a mechanism for asymmetric or symmetric access of a logical unit or LUN as used herein. ALUA allows the data storage system to set a LUN's access state with respect to a particular initiator port and the target port. Thus, in accordance with the ALUA standard, various access states may be associated with a path with respect to a particular device, such as a LUN. In particular, the ALUA standard defines such access states including the active-optimized, active-non optimized, and unavailable states as described herein. The ALUA standard also defines other access states, such as standby and in-transition or transitioning (i.e., denoting that a particular path is in the process of transitioning between states for a particular LUN). A recognized path (such as recognized by a host as a result of discovery processing) over which I/Os (e.g., read and write I/Os) may be issued to access data of a LUN may have an "active" state, such as active-optimized or active-non-optimized. Active-optimized is an active path to a LUN that is preferred over any other path for the LUN having an "active-non optimized" state. A path for a particular LUN having the active-optimized path state may also be referred to herein as an optimized or preferred path for the particular LUN. Thus active-optimized denotes a preferred path state for the particular LUN. A path for a particular LUN having the active-non optimized (or unoptimized) path state may also be referred to herein as a non-optimized or non-preferred path for the particular LUN. Thus active-non-optimized denotes a non-preferred path state with respect to the particular LUN. Generally, I/Os directed to a LUN that are sent by the host to the data storage system over active-optimized and active-non optimized paths are processed by the data storage system. However, the host may select to send I/Os to a LUN from those paths having an active-optimized state for the LUN. The host may proceed to use a path having an active-unoptimized state for the LUN only if there is no active-optimized path for the LUN. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

In one system not using the techniques herein, all paths between the host and the data storage system may be set to active-optimized for all LUNs exposed over such paths. In such existing systems, the collective set of paths for the exposed LUNs include paths between the host and both nodes of the data storage system. The host may select which of the paths to both nodes to use when sending I/Os to a particular LUN, where I/Os to the same LUN are serviced using both nodes. When one node of the data storage system receives an I/O directed to target LBA of a LUN, processing may be performed to control or synchronize access to shared metadata (MD), physical device locations, and the like. Since both nodes may service I/Os to the LUN at the same time, both nodes may access the same MD and PD locations storing the content for the target LBA of the LUN. Processing may be performed to synchronize and control access to such shared resources such as the MD and PD locations for the LUN. Such processing may include communicating with the peer node to synchronize access to the MD and PD locations storing content for the LUN. Such processing performed to synchronize and control access between the two nodes in an ongoing basis adds extra overhead to manage the shared resource contention between the two nodes.

In another system not using the techniques, each LUN may be owned by a single one of the nodes where I/Os directed to the LUN are only serviced by the single node that owns the LUN. In this other system, all paths for the LUN may be configured as active-optimized as noted above so that both nodes may receive I/Os directed to the same LUN. However, in this other system, I/Os received by the non-owning node are internally redirected or forwarded to the owning node for servicing. Any data or status returned for the redirected I/O is also returned indirectly from the owning node, to the non-owning node and then to the requesting host. Although this system having a single owning node service I/Os reduces the overhead associated with synchronizing access to shared MD and content between the nodes, this system adds overhead with the I/O redirection or forwarding.

In yet another system not using the techniques herein, the data storage system may set paths to one of the nodes for a particular LUN to the active-optimized setting and set other paths to the remaining node for the particular LUN to another ALUA state other than active-optimized. In this manner, as long as there is at least one functioning active-optimized path, the I/Os for the particular LUN may only be serviced by a single node. However, this system has a disadvantage with load balancing in that the host may perform load balancing over paths to only a single node. In other words, all active-optimized paths are between the host and the same single node.

Described in the following paragraphs are techniques that may be used in connection with dynamically modifying the associated ALUA states of paths for a particular one or more LUNs in order to rebalance the I/O load of the LUNs among the nodes of the data storage system. Determining whether to rebalance the I/O workload of LUNs between the two nodes may be performed in accordance with one or more criteria. In at least one embodiment, processing may include monitoring the current workloads of both nodes over time and periodically evaluating, in accordance with the one or more criteria, whether the current workloads of the nodes are imbalanced. The monitoring may also include determining whether one of the nodes is overloaded based on the criteria, for example, where the criteria may specify that a node is overloaded if its current workload exceeds a specified maximum threshold. The criteria may also specify, for example, that two nodes having a workload imbalance if the difference between the current workloads of the two nodes exceeds a specified maximum allowable difference. Responsive to determining, in accordance with the criteria, that rebalancing of workload between the nodes is needed, the rebalancing may be performed. In at least one embodiment, it may be determined to rebalance the workload if any one or more of the specified criteria or trigger conditions denoting a workload imbalance is met. Generally, each such condition (also referred to as a trigger condition) evaluating to true may denote a workload imbalance, alone or possibly in combination with, specified threshold conditions for the current workloads.

The current workloads of the nodes may be measured using any suitable one or more workload metrics. Additionally, the one or more criteria may specify conditions denoting workload imbalances where the conditions are expressed using the one or more workload metrics. The one or more metrics may include at least one metric related to per node resource utilization such as, for example, one or more of the following: per node CPU utilization, per node cache utilization, per node memory utilization, per node offload processing. The one or more metrics may include at least one metric related to per node performance such as, for example, one or more of the following: per node I/O performance metric, per node average I/O response time (RT), and per node backend (BE) access time or BE I/O rate in connection with accessing data stored on BE non-volatile storage of the data storage system.

In at least one embodiment in which the data storage system has two nodes, the LUNs exposed over target ports of the data storage system to one or more hosts may be initially assigned, partitioned or distributed among the two nodes for a preferred path designation. The LUNs may be initially partitioned in any suitable manner. In one embodiment, the LUNs may be distributed among the two nodes of the system using a round robin technique. A LUN distributed or assigned to a particular node means that the one or more paths to the particular node are designated as preferred paths for the LUN with all remaining paths to the other peer node designated as non-preferred paths for the LUN. Thus, the particular node to which a LUN is assigned may be characterized as the initial preferred node for the LUN where all paths to the preferred node may be initially assigned an active-optimized or preferred path state for the LUN. Additionally, the other peer node to which the LUN is not assigned may be characterized as the initial non-preferred node for the LUN where all paths to the non-preferred node may be initially assigned an active-non optimized or non-preferred path state for the LUN.

In at least one embodiment after the initial partitioning or assigning of the LUNs among the two peer nodes in the data storage system, processing may be performed in an ongoing continuous manner to measure the workload on both of the nodes. For example, a determination as to whether there is a workload imbalance among the nodes requiring workload redistribution among the nodes may be performed periodically at predetermined time intervals, may be performed responsive to certain events, may be performed on demand, and the like. If there is a workload imbalance denoting by a trigger condition, for example, that a first busy node is approaching maximum workload saturation or utilization and the other second node is not busy (e.g., has a current workload that is less than a minimum amount), processing may be performed to rebalance the workload of the LUNs among the two nodes. The rebalancing of the workload may include moving the I/O workload for one or more of the LUNs from the first busy node to the second non-busy node by modifying the ALUA path states of the one or more LUNs. In particular, the processing may modify the preferred path state of the one or more of the LUNs from the first busy node to the second non-busy node, where paths to the first busy node for the one or more LUNs may be modified from preferred to non-preferred paths, and where paths to the second non-busy node for the one or more LUNs may be modified from non-preferred to preferred paths. Responsive to the foregoing path state changes for the one or more LUNs, the host from which the paths originate may be notified by the data storage system regarding the path state changes. The notification may be characterized in one aspect as a hint regarding the path status changes for the one or more LUNs. In at least one embodiment, the host may use preferred paths for a LUN rather than non-preferred paths to send I/Os to the LUN. In this manner, the I/O workload for one or more LUNs may be shifted from a busy node to a non-busy node by modifying the path states for the LUNs to the busy node from preferred to non-preferred and by modifying the path states for the LUNs to the non-busy node from non-preferred to preferred. Selecting the particular one or more LUNs whose workload is shifted from the busy node to the non-busy node may be performed using any suitable technique. For example, in at least one embodiment, the busy node may be assigned as the preferred node with preferred paths for the one or more LUNs selected. Additionally the one or more LUNs selected may have the highest workload with respect to all LUNs assigned to the busy node as the preferred node.

In at least one embodiment, the host may use the current states of paths for a particular LUN to select a path over which to send I/Os directed to the particular LUN. In at least one embodiment, the host may select a path for a LUN designated as preferred over another path designated as non-preferred. If there are multiple preferred paths, the host may use any suitable technique to select one of the available multiple preferred paths for sending an I/O to the particular LUN. If no preferred paths are active or available or use, the host may select a non-preferred path for sending the I/O to the particular LUN. Thus, the data storage system may perform load balancing of the LUNs among the nodes of the data storage system by first changing the preferred path state and non-preferred path state for paths to the different nodes for the LUNs, and then providing notification regarding the path state changes for the LUNs to the host.

A data storage system may perform load balancing using the techniques described herein. The load balancing may be performed in accordance with the multiple I/O workloads of multiple LUNs accessed over multiple paths by multiple hosts. Such load balancing from the data storage system perspective is much broader than a single host perspective where a single host may perform load balancing with respect to only paths between the single host and the data storage system.

The foregoing and other aspects of the techniques herein are described in more detail in following paragraphs.

Figure 3A:
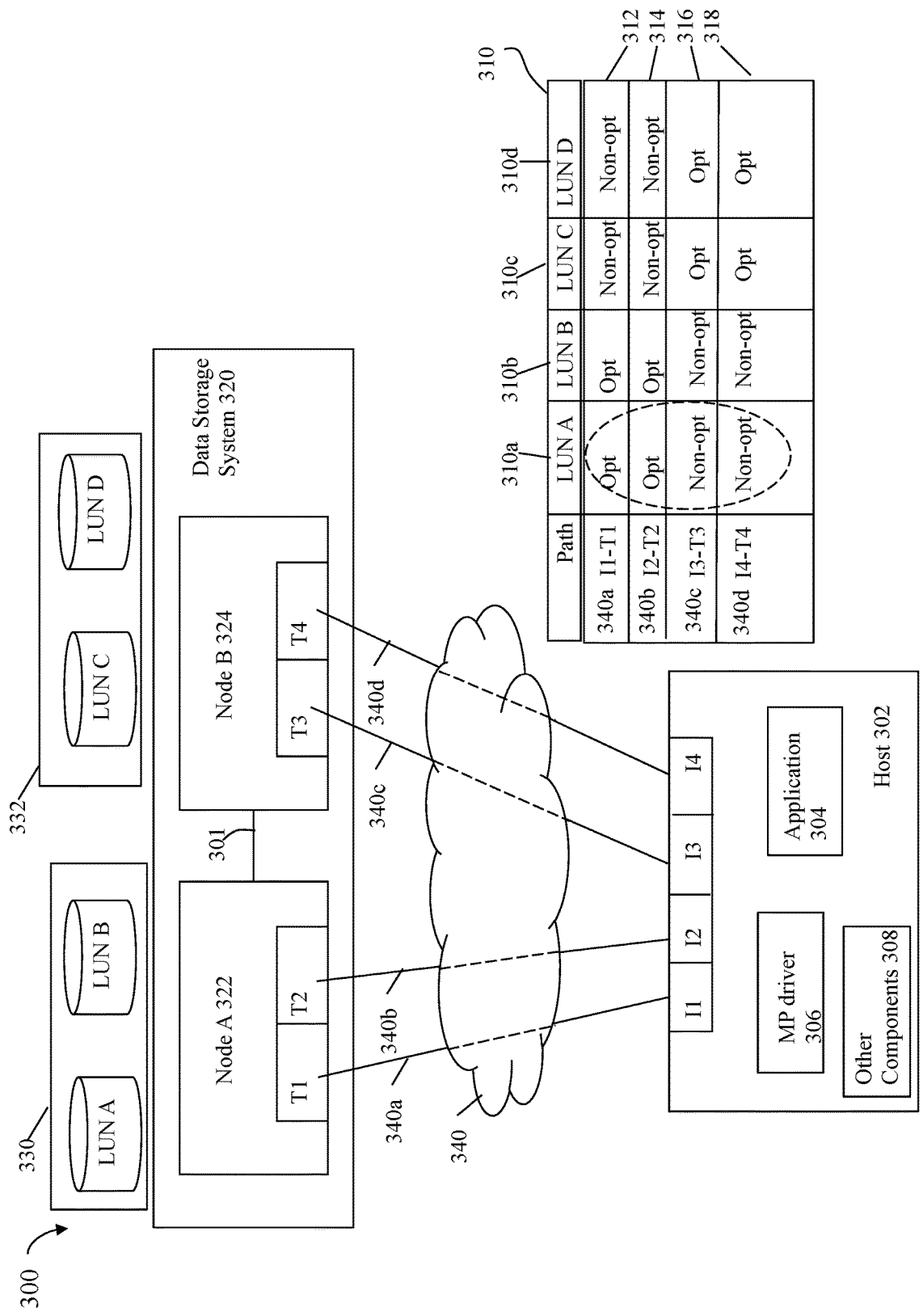
FIGS. 3A and 3B are examples illustrating use of the techniques herein to rebalance workload among the nodes of the data storage system in an embodiment in accordance with the techniques herein.

Referring to FIG. 3A, shown is an example of an embodiment of a system that may be utilized in connection with the techniques herein. The example 300 includes a host 302, a network 340 and a data storage system 320. The host 302 and data storage system 320 may communicate over one or more paths 340a-d through the network 340. The paths 340a-d are described in more detail below. The LUNs A and B are included in the set 330, and the LUNs C and D are included in the set 332. The LUNs of the sets 330 and 332 are configured from non-volatile BE storage PDs of the data storage system 320. The data storage system includes two nodes—node A 322 and node B 324. The nodes 322, 324 may be as described elsewhere herein. The element 301 denotes an internode communication connection similar, for example, to the connection 120 of FIG. 2. Consistent with other discussion herein such as in connection with FIG. 2, the BE PDs from which storage is provisioned for the LUNS of 330, 332 are accessible to both the nodes 322, 324.

The host 202 may include an application 304, a multi-path (MP) driver 306 and other components 308. The other components 308 may include, for example, one or more other device drivers, an operating system, and other code and components of the host. An I/O operation from the application 304 may be communicated to the data storage system 320 using the MP driver 306 and one or more other components of the data path or I/O path. The application 304 may be a database or other application which issues data operations, such as I/O operations, to the data storage system 320. Each of the I/O operations may be directed to a LUN, such as one of the LUNs of 330, 332, configured to be accessible to the host 302 over multiple physical paths. As such, each of the I/O operations may be forwarded from the application 304 to the data storage system 320 over one of the possible multiple paths.

The MP driver 306 may include functionality to perform any one or more different types of processing such as related to multipathing. For example, the MP driver 306 may include multipathing functionality for management and use of multiple paths. For example, the MP driver 306 may perform path selection to select one of the possible multiple paths based on one or more criteria such as load balancing to distribute I/O requests for the target device across available active-optimized or preferred paths. Host side load balancing may be performed by the MP driver to provide for better resource utilization and increased performance of the host, data storage system, and network or other connection infrastructure. The MP driver 306 may be included in a commercially available product such as, for example, Dell® EMC PowerPath® software by Dell Inc. The host 302 may also include other components 308 such as one or more other layers of software used in connection with communicating the I/O operation from the host to the data storage system 120. For example, element 108 may include Fibre Channel (FC) and SCSI drivers, a logical volume manager (LVM), and the like. It should be noted that element 308 may include software or other components used when sending an I/O operation from the application 304 where such components include those invoked in the call stack of the data path above the MP driver 306 and also below the MP driver 306. For example, application 304 may issue an I/O operation which is communicated in the call stack including an LVM, the MP driver 306, and a SCSI driver.

The data storage system 320 may include one or more BE PDs configured to store data of one or more LUNs as described above. Each of the LUNs 330, 332 may be configured to be accessible to the host 302 through multiple paths. The node A 322 in this example has two data storage system target ports T1 and T2. The node B 324 in this example has two data storage system target ports T3 and T4. The host 302 includes 4 host initiator ports I1, I2, I3 and I4. The path 340a is formed using the endpoints I1 and T1 and may be denoted as I1-T1. The path 340b is formed using the endpoints I2 and T2 and may be denoted as I2-T2. The path 340c is formed using the endpoints I3 and T3 and may be denoted as I3-T3. The path 340d is formed using the endpoints I4 and T4 and may be denoted as I4-T4.

In this example, all of the LUNs A, B C and D may be accessible or exposed over all the data storage system target ports T1, T2, T3 and T4 over the paths 340a-d. As described in more detail below, a first set of paths to the node A 322 may be specified as active-optimized or preferred for the LUNs of the set 330 and a second set of paths to the node B 324 may be specified as active-optimized or preferred for the LUNs of the set 332. Additionally the first set of paths to the node A 322 may be specified as active-non optimized or non-preferred for the LUNs of the set 332 and the second set of paths to the node B 324 may be specified as active-non optimized or non-preferred for the LUNs of the set 330.

The multiple active paths allow the application I/Os to the LUNs A, B C and D to be routed over the multiple paths 340*a-d* and, more generally, allow the LUNs A, B C and D to be accessed over the multiple paths 340*a-d*. In the event that there is a component failure in one of the active-optimized multiple paths for a particular LUN, application I/Os directed to the particular LUN can be easily routed over other alternate preferred paths unaffected by the component failure. Additionally, in the event there are no preferred paths available for issuing I/Os to the particular LUN, non-preferred paths for the particular LUN may be used to send the I/Os to the particular LUN. Thus, an embodiment of the MP driver 306 may also perform other processing in addition to load balancing in connection with path selection. The MP driver 106 may be aware of, and may monitor, all paths between the host and the LUNs A, B C and D in order to determine that particular state of such paths with respect to the various LUNs. In this manner, the MP driver may determine which of the multiple paths over which a LUN is visible may be used for issuing I/O operations successfully. Additionally, the MP driver may use such information to select a path for host-data storage system communications issued to the particular LUN.

In the example 300, each of the LUNs A, B C and D may be exposed through the 4 paths 340*a-d*. As described in more detail below, each of the paths 340*a-d* may have an associated ALUA state also used by the host when issuing I/O operations. Each path 340*a-d* may be represented by two path endpoints—a first endpoint on the host 302 and a second endpoint on the data storage system 320. The first endpoint may correspond to a port of a host component, such as a host bus adapter (HBA) of the host 302, and the second endpoint may correspond to a target port of a data storage system component, such as a target port of a node of the data storage system 320. In the example 300, the elements I1, I2, I3 and I4 each denote a port of the host 302 (e.g. such as a port of an HBA), and the elements T1, T2 T3 and T4 each denote a target port of a node of the data storage system 320.

The MP driver 306, as well as other components of the host 302, may execute in kernel mode or other privileged execution mode. In one embodiment using a Unix-based operating system, the MP driver 306 may execute in kernel mode. In contrast, the application 304 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, the application 304 may issue one or more I/O operations (e.g., read and write commands or operations) may be then mapped to data operations directed to LUNs of the data storage system. Such I/O operations from the application 304 may be directed to the MP driver 306 after passing through any intervening layers of the data or I/O path.

In connection with the SCSI standard, a path may be defined between two ports as described above. A command may be sent from the host (as well as a component thereof such as a HBA) and may be characterized as an initiator, originator or source with respect to the foregoing path. The host, as the initiator, sends requests to a data storage system (as well as a particular component thereof such as node having a port with a network address) characterized as a target, destination, receiver, or responder. Each physical connection of a path may be between a first endpoint which is an initiator port (e.g., I1) of the host and a second endpoint (e.g., T1) which is a target port of node in the data storage system. Over each such path, one or more LUNs may be visible or exposed to the host initiator through the target port of the data storage system.

In connection with some protocols such as the SCSI protocol, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In an embodiment described herein, the data storage system 320 may be a SCSI-based system such as SCSI-based data storage array operating in accordance with the ALUA standard. As described herein, a data storage system in accordance with techniques herein may set an access path state for a particular LUN over a particular path from an initiator to a target of the data storage system. For example, the data storage system may set an access path state for a particular LUN on a particular path to active-optimized (also referred to herein as simply "optimized" or "preferred") to denote the path as a preferred path for sending I/Os directed to the LUN. The data storage system may set an access path state for a particular LUN on a particular path to active-non optimized (also referred to herein as simply "non-optimized" or "non-preferred") to denote a non-preferred path for sending I/Os directed to the LUN sent. The data storage system may also set the access path state for a particular LUN on a particular path to other suitable access states.

In accordance with the techniques herein, the data storage system may set the path state for a particular LUN to preferred or non-preferred in connection with processing performed to load balance or rebalance I/O workload of the LUNs among the nodes. Thus, multipathing software, such as the MP driver, on the host may monitor the particular access path state as may be set by the data storage system with respect to a particular LUN to determine which path to select for sending I/Os to the LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which I/Os may be issued to the LUN. Use of such access state changes in connection with techniques herein is described in more detail below.

The elements 330 and 332 may denote the initial partitioning or assignment of the 4 LUNs A, B, C and D among the nodes A and B at a first point in time. In this example, the element 330 indicates that the LUN A and the LUN B are initially assigned to node A 322 whereby the paths 340*a-b* to the target ports T1 and T2 of node A 322 are set to preferred or optimized for the LUNs A and B and set to non-optimized or non-preferred for the remaining LUNs C and D. The element 332 indicates that the LUN C and the LUN D are initially assigned to node B 324 whereby the paths 340*c-d* to the target ports T3 and T4 of node B 324 are set to optimized or preferred for the LUNs C and D and set to non-optimized or non-preferred for the remaining LUNs A and B.

In at least one embodiment, target ports are given identifiers and may be organized into target port groups (TPGs). In at least one embodiment, a TPG may be defined as a logical grouping or collection of one or more target port identifiers that share the same access characteristics for a particular LUN. For example, target ports T1 and T2 may be included in a first TPG and target ports T3 and T4 may be included in a second TPG. With ALUA in at least one embodiment, a LUN may be visible with respect to the entire TPG rather than on a port level basis. In other words, a LUN may be exposed or visible on a TPG level. If the LUN is visible or accessible on a first target port in the first TPG including that first target port, then the LUN is also accessible or visible on all targets ports of the first TPG. Each TPG can take on a state (e.g., preferred or non-preferred). For a given LUN, the LUN is visible on the TPG level basis (e.g. with respect to all target ports of a TPG). Thus the LUN has the same path state or access characteristic with respect to all target ports of the same TPG. For example, the first TPG noted above may include all target ports of one of the nodes such as node A 322 over which the LUNs A, B, C and D are exposed; and the second TPG noted above may include all target ports of one of the nodes such as node B 324 over which the LUNs A, B, C and D are exposed.

The table 310 denotes the different path states for each of the 4 paths for the 4 LUNs A, B C and D. The table 310 reflects the path states after the initial partitioning or assignment of LUNs to the nodes 322, 324 as denoted, respectively, by the sets 330, 332. The row 312 indicates that path I1-T1 including the target port T1 of node A 322 is optimized (opt) or preferred for the LUNs A and B and non-optimized (non-opt) or non-preferred for the LUNs C and D. The row 314 indicates that path I2-T2 including the target port T2 of node A 322 is optimized (opt) or preferred for the LUNs A and B and non-optimized (non-opt) or non-preferred for the LUNs C and D. The row 316 indicates that path I3-T3 including the target port T3 of node B 324 is optimized (opt) or preferred for the LUNs C and D and non-optimized (non-opt) or non-preferred for the LUNs A and B. The row 318 indicates that path I4-T4 including the target port T4 of node B 324 is optimized (opt) or preferred for the LUNs C and D and non-optimized (non-opt) or non-preferred for the LUNs A and B.

At the first point in time when the initial partitioning of the LUNs among the two nodes 322, 324 noted above is performed, assume that a first workload of the node 322 and a second workload of the node 324 are about the same within a specified tolerance. In this example, assume that the workload of a node is measured based on the per node CPU utilization expressed as a percentage from 0% (denoting an idle CPU) to 100% (denoting full CPU utilization). It should be noted that some embodiments may choose to express CPU utilization to allow utilization greater than 100% such as where there are multiple core CPUs. However for simplicity, assume that the CPU utilization in this example is a percentage in the range from 0 to 100. At this first point in time, assume that the CPU utilization of node A 322 is 50% and the CPU utilization of node B 324 is 55%.

The workload of the nodes 322, 324 may be monitored periodically to determine whether a trigger condition of the criteria is met and thereby triggering load rebalancing between the nodes 322, 324. In this example, the criteria may include a first trigger condition specifying that load rebalancing is performed if A) the difference in the current workloads of the two nodes exceeds a specified maximum allowable workload difference and B) if the current workload of at least one of the nodes exceeds a specified maximum workload. In the first trigger condition, when the part A (i.e., the difference in the current workloads of the two nodes exceeds a specified maximum difference) is true, the current workloads of the nodes are imbalanced since the difference exceeds the specified maximum allowable workload difference. When the part B (i.e., if the current workload of at least one of the nodes exceeds a specified maximum workload) of the first trigger condition is true, the workload of one of the nodes exceeds the specified maximum workload and may be characterized as overloaded. In at least one embodiment, the part B may be included in the first trigger condition to avoid rebalancing the workload of the two nodes if no node is overloaded. As a variation, an embodiment may alternatively include a different trigger condition that includes only the part A and omits the part B of the first trigger condition noted above.

At a second point in time subsequent to the first point in time, the workloads of the nodes 322, 324 may be measured and determined to meet the above-noted first trigger condition of the criteria. For example, at the second point in time, the I/O workloads directed to the LUNs A and B, and thus to the node A 322, may become very active or heavy. In contrast, at the second point in time, the I/O workloads directed to the LUNs C and D, and thus to node B 324, may be very low or inactive. For example, the CPU utilization of node A 322 may be 90% and the CPU utilization of node B 324 may be 20%. Thus, there is a large difference of 70% between the I/O workloads directed to the nodes 322, 324 where the large difference of 70% exceeds 10%, the specified maximum allowable workload difference of the part A) of the first trigger condition. Additionally, the current workload of node A=90% may exceed 85%, the specified maximum workload and may be characterized as overloaded.

Thus, at the second point in time, the first trigger condition evaluates to true thereby triggering load rebalancing of the workload of the LUNs among the nodes. Continuing with this example, assume that the load rebalancing performed includes shifting the I/O workload of one or more LUNs from the busy node A to the inactive or lower activity node B. Thus load rebalancing includes selecting one or more LUNs having preferred paths 340*a-b* to the busy node A and non-preferred paths 340*c-d* to node B, setting the paths 340*a-b* for the one or more LUNs to the busy node A to non-preferred, and setting the paths 340*c-d* for the one or more LUNs to the lower activity node B to preferred. The columns 310*a-b* of the table 310 denote the path settings, respectively, for the LUNs A and B of the set 330. The columns 310*c-d* of the table 310 denote the path settings, respectively, for the LUNs A and B of the set 330.

Figure 3B:
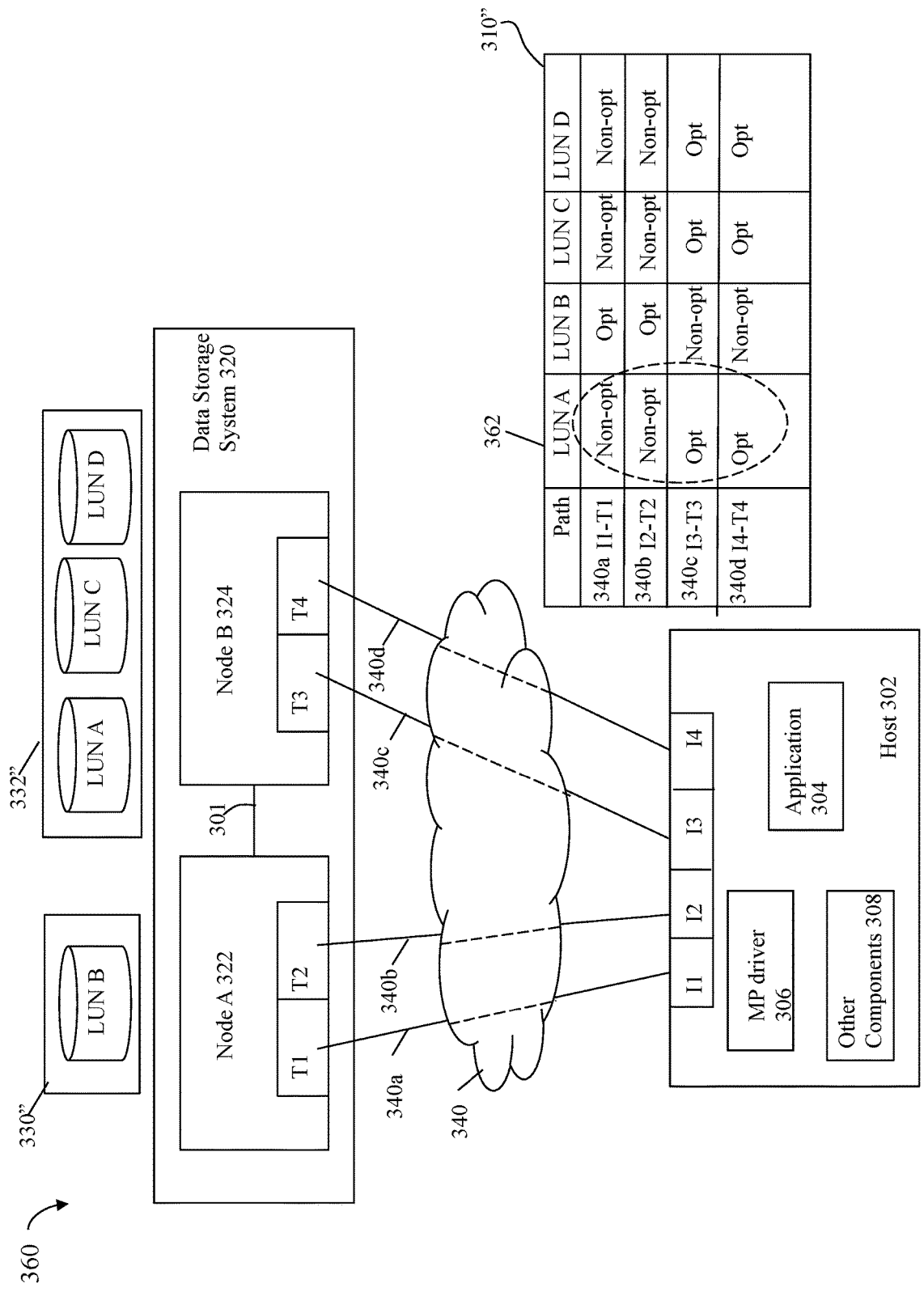

In one aspect, the LUNs of the set 330 having preferred paths 340a-b to the node A 322 and non-preferred paths 340c-d to the node B 324 may be characterized as candidates from which the one or more LUNs are selected for having their workload shifted from the node A 322 to the node B 324. Thus the load rebalancing in this example includes selecting one of the LUNs A and B from set 330. Any suitable criteria may be used to select one or more LUNs from the set of candidate LUNs 330. For example, one or more I/O workload metrics may be collected for each of the LUNs 330 and the candidate LUNs may be ranked, from highest I/O workload to lowest I/O workload, based on the one or more I/O workload metrics. The I/O workload metric used may be, for example, an I/O rate for the LUN such as I/Os per second (IOPS). Assume that LUN A has a higher I/O rate than LUN B. In this case, LUN A may be selected to have its workload shifted from the busy node A to the lower activity node B. In accordance with the techniques herein, the load rebalancing may include modifying the path states of the column 310a of the table 310 of the table 310 for the selected LUN A to have values as denoted by the columns 362 of the table 310" of the FIG. 3B. The FIG. 3B includes similarly numbered components as in the FIG. 3A with the following differences:

1. the table 310 of FIG. 3A is updated as a result of load rebalancing to have the values as in the table 310" of the FIG. 3B. In particular, the table 310 of FIG. 3A and the table 310" of FIG. 3B differ only in that the column 310a of the FIG. 3A is updated by load rebalancing to have the updated values as denoted by the column 362 of the FIG. 3B. The column 362 indicates that the path states for LUN A have been updated to specify the paths 340a-b to the node A 322 as non-preferred or non-optimized (non-opt) and the paths 340c-d to the node B 324 as preferred or optimized (opt).
2. the LUN sets 330, 332 of FIG. 3A are updated as a result of load rebalancing to the LUN sets 330", 332" of FIG. 3B as a result of load rebalancing. In particular the LUN sets 330", 332" indicate that the LUN A has been moved or reassigned by load rebalancing to the node B as its preferred node whereby the paths 340c-d to node B transition from the non-preferred to the preferred state for the LUN A, and the paths 340a-b to node A transition from the preferred state to the non-preferred state for the LUN A.

Responsive to the data storage system updating the table 310 of FIG. 3A to have the values as in the table 310" of the FIG. 3B, the data storage system may notify the host regarding the path state changes and the updated path states as illustrated by the column 362. Based on the information in the column 362, the host may subsequently send I/Os to the LUN A using the preferred paths 340c-d rather than the non-preferred path 340a-b. In at least one embodiment, the MP driver 306 of the host 302 may use the information of the received notification identifying the state changes of the column 362. The host 302 may send I/Os to a LUN over the paths identified as preferred or optimized for the LUN. The host may always send I/Os using only the optimized or preferred paths. If there are no active optimized or preferred paths for the LUN, the host may then utilized one of the active non-preferred or non-optimized paths for the LUN. Thus, the path state modifications as illustrated by the column 362 effectively shift or move subsequent I/O workload of the LUN A from the node 322 to the node 324.

At a third point in time subsequent to the second point in time, the workloads of the nodes 322, 324 may once again be measured and evaluated to determine whether the above-noted first trigger condition of the criteria evaluates to true. Responsive to the first trigger condition, or more generally any other trigger condition of the criteria, evaluating to true, processing may be performed to load rebalance the workload of the LUNs among the nodes and then notify the host regarding any changes to the path states for the LUNs. The load rebalancing performed at subsequent points in time may be similar to that as described above as performed at the second point in time to shift workload of one or more LUNs from a busy node to a non-busy node. In connection with the techniques herein, the workload shift may be accomplished by modifying the preferred and non-preferred paths states for the one or more selected LUNs having their workload shifted from the busy node to the non-busy node.

Although the foregoing example of FIGS. 3A and 3B illustrates only a single host and a single data storage system for simplicity of illustration, more generally the techniques described herein may be used in an embodiment having any number of data storage systems and any number of hosts or other clients and any suitable number of paths.

In the embodiment illustrated in connection with the FIGS. 3A and 3B, both nodes 322, 324 have access to the same set of BE PDs and are capable of servicing I/Os directed to the collective set of LUNs denoted by the LUN sets 330, 332 and 330", 332". Both nodes 322, 324 may be servicing I/Os at the same time and may require access to one or more of the same MD blocks. More generally, there may be blocks of data that both nodes 322, 324 may require to service I/Os. Since both nodes 322, 324 may access the same MD or other shared data at the same time, processing may be performed to synchronize and control access to such shared data. Generally, any suitable synchronization technique may be used to control access to the shared data between the nodes 322, 324.

In at least one embodiments, locks may be used to synchronize access to the shared MD blocks and other shared data between the nodes 322, 324. The processing performed to synchronize access using the locks may include performing internode communications over the internode connection 301 between the nodes 322, 324. Each node may communicate with its peer node, for example, to acquire the necessary lock(s) needed for accessing shared blocks when performing an I/O operations. For example, when node A 322 writes to a target LBA, node A may communicate with node B to obtain one or more locks for exclusive access or write access to the necessary MD pages and PD location storing the write data. Node A may be unable to acquire a necessary lock such as for a MD page and may have to wait to obtain the lock for write or exclusive access of the MD page, for example, if node B currently holds a lock for shared/reading or exclusive access/writing to the MD page.

In at least one embodiment, sticky locks may be used to synchronize access to the shared MD blocks and other shared data between the nodes 322, 324. A node may acquire a lock from its peer node and be designated as the lock owner. With non-sticky locks, the lock owner may automatically release the lock when done using the associated resource for the lock. With sticky locks, the lock owner does not automatically release the lock when done using the associated resource. Rather, the lock owner may be characterized as retaining lock ownership until the lock is requested or solicited for use by another node. Thus, if the last or most recent lock owner once again needs the same lock before its peer node has requested the same lock, the last or most recent owner does not have to issue an internode communication request over the connection 301 to its peer node for the lock. Generally, the last or most recent owner of a lock retains ownership or holds the lock until solicited or requested by another node. In at least one embodiment, each shared MD or data block may be implemented using a sticky lock having 2 tokens. When a node wants read or shared access to the block, the node acquires 1 token of the lock for that block. When a node wants exclusive or write access to the block, the node acquires both tokens of the lock for the block. With sticky locks when a node A that has one or more tokens is done using the associated resource, the node A does not automatically release the one or more tokens. Thus, a node A retains the one or more tokens even if the node A is not actively using the resource associated with the one or more tokens. The node A having the one or more tokens may release the one or more tokens if node A is not actively using the associated resource and if the node A is requested to release the one or more tokens by the peer node B for node B's use. Put another way, node A releases the one or more tokens responsive to a request from node B for the one or more of the tokens held by node A provided that node A is not currently actively using the associated resource requiring the requested one or more tokens. For example, assume node A has 2 tokens for the shared resource and is currently accessing the shared resource for exclusive or write access. When node A is done requiring exclusive access to the shared resource, node A retains ownership of the 2 tokens. If node B now wants read or shared access to the shared resource, node B requests 1 of the 2 tokens from node A where node A releases the requested 1 token to node B. Alternatively, if node B now wants write or exclusive access to the shared resource, node B requests the 2 tokens from node A where node A releases the requested 2 tokens to node B.

In at least one embodiment, a sticky lock having 2 tokens as described above may be associated with each block or other size unit. Thus, each block of MD and each data block of stored user data may have an associated lock. Consistent with discussion herein each LBA of a LUN may have its content stored at a PD location of BE PD. MD may be used as a mapping layer to map a logical address, in the form of a LUN and LBA, to its corresponding PD location on the BE PD. Generally, one or more MD blocks may be used as the mapping layer that maps the logical address of a LUN and LBA to its corresponding the PD location. In at least one embodiment, the MD mapping layer may be in the form of a hierarchical structure such as a tree including 3 layers or levels. Thus for first data written to the LUN and LBA, 3 MD blocks may be accessed when storing the first data to its corresponding PD location. In such an embodiment, a different lock may be associated with each individual chunk or block of MD, where 3 locks may be acquired for the 3 MD blocks when writing the first data out to the corresponding PD location. The particular type of lock needed, such as shared/read or write/exclusive, may vary per MD page depending on the particular write operation and embodiment.

In an embodiment in accordance with the techniques herein using sticky locks, there may be some additional overhead for a node to acquire locks as a result of transitioning preferred paths for a LUN to the node as a result of performing load rebalancing. However, such overhead associated with the sticky locks is reduced as compared to other alternative implementations not using the techniques herein such as where all paths to both nodes are preferred for the LUN.

As described above, an imbalance with respect to the workload of the nodes may be determined in accordance with one or more criteria or trigger conditions. If one or more of the criteria or trigger conditions is met, an imbalance in workload of the nodes may be determined resulting in performing processing to rebalance the workload of the nodes. Such rebalancing of the workload may include dynamically modifying the particular paths that are designated as preferred or optimized paths for one or more LUNs to shift the I/O workload of such LUNs from a first node that is very busy or saturated to a second node that is less busy with a less workload. A first node may have a first group of one or more target ports over which a first LUN group of LUNs are exposed on a first group of paths designated as optimized or preferred paths. A second node may have a second group of one or more target ports over which the first LUN group of LUNs are exposed on a second group of paths designated as non-optimized or non-preferred paths. If the first node is determined as overloaded and having a higher workload than the second node, processing may be performed to rebalance the workloads of the nodes. The processing may include modifying the path state for the first group of paths for one or more LUNs of the first LUN group from optimized or preferred to non-optimized or non-preferred, and modifying the path state for the second group of paths for one or more LUNs of the first LUN group from non-optimized or non-preferred to optimized or preferred, thereby moving I/O workload from the first node to the second node where the second node is now preferred for servicing I/Os of the one or more LUNs.

Generally the trigger conditions or criteria may specify conditions that, if true, denote an imbalance in resource utilization or performance with respect to one or more resources of each node. The criteria may specify one or more resource utilization metrics and/or one or more performance metrics used in connection with determining whether to perform processing to dynamically rebalance the workload between the nodes. As described herein, the rebalancing performed may include dynamically modifying the particular paths designated as preferred or optimized for one or more LUNs and those paths designated as non-preferred or non-optimized for the one or more LUNs to shift I/O workload from a first node to a second node where the first node may be determined as overloaded and/or having a higher workload than the second node.

The one or more criteria or trigger conditions may include CPU utilization per node. Rebalancing may be performed if the difference in CPU utilization between the two nodes exceeds a specified threshold difference. For example, the criteria may indicate to perform load balancing that dynamically modifies the optimized or preferred paths of one or more LUNs from node A to node B if the CPU utilization of node A exceeds the CPU utilization of node B by at least the specified threshold difference. The criteria may also indicate that the rebalancing is performed only if the busy node from which workload is shifted from, such as the foregoing busy node A, has at least a minimum CPU utilization.

The one or more criteria or trigger conditions may include memory utilization per node. Rebalancing may be performed if the difference in memory utilization between the two nodes exceeds a specified threshold difference. For example, the criteria may indicate to perform load balancing that dynamically modifies the optimized or preferred paths of one or more LUNs from node A to node B if the memory utilization of node A exceeds the memory utilization of node B by at least the specified threshold difference. The criteria may also indicate that the rebalancing is performed only if the busy node from which workload is shifted from, such as the foregoing busy node A, has at least a minimum memory utilization.

The one or more criteria or trigger conditions may include cache utilization per node. Rebalancing may be performed if the difference in cache utilization between the two nodes exceeds a specified threshold difference. For example, the criteria may indicate to perform load balancing that dynamically modifies the optimized or preferred paths of one or more LUNs from node A to node B if the cache utilization of node A exceeds the cache utilization of node B by at least the specified threshold difference. The criteria may also indicate that the rebalancing is performed only if the busy node from which workload is shifted from, such as the foregoing busy node A, has at least a minimum cache utilization.

The one or more criteria or trigger conditions may include a performance metric of the BE access time or BE I/O rate (e.g., IOs/per second) or data transfer rate (e.g., megabytes/second) per node. Rebalancing may be performed if the difference in BE PD access time or I/O rate between the two nodes exceeds a specified threshold difference. For example, the criteria may indicate to perform load balancing that dynamically modifies the optimized or preferred paths of one or more LUNs from node A to node B if the BE access time or I/O rate of node A exceeds the BE access time or I/O rate of node B by at least the specified threshold difference. The criteria may also indicate that the rebalancing is performed only if the busy node from which workload is shifted from, such as the foregoing busy node A, has at least a minimum BE access time or I/O rate.

The one or more criteria or trigger conditions may include a performance metric of the average I/O RT for each node. Rebalancing may be performed if the difference in average I/O RT between the two nodes exceeds a specified threshold difference. For example, the criteria may indicate to perform load balancing that dynamically modifies the optimized or preferred paths of one or more LUNs from node A to node B if the average I/O RT of node A exceeds average I/O RT of node B by at least the specified threshold difference. The criteria may also indicate that the rebalancing is performed only if the busy node from which workload is shifted from, such as the foregoing busy node A, has at least a minimum average I/O RT.

The one or more criteria or trigger conditions may include the per node resources used in connection the data services and servicing control or management path commands. Nodes may perform data services such as to process control or management path commands and other processing besides servicing I/O operations. For example, such data services may include garbage collection, remote replication, creating local snapshots, and the like. For example, one node such as node A may be determined to use more than a maximum threshold amount of its resources (e.g., in terms of CPU, memory and/or cache) in performing data services. Additionally, the amount of resources utilized by node A in performing such data services may exceed the amount of resources utilized by node B in performing such data services by at least a specified minimum amount. In this case, node A may be characterized as overloaded with respect to the amount of its resources utilized on data services, and additionally, node A and node B may be characterized as imbalanced with respect to resources utilized for data services, where the criteria may indicate to perform load balancing to dynamically modify and move the optimized or preferred paths of one or more LUNs from node A to node B.

The one or more criteria or trigger conditions may include the per node resources used in connection with offload processing. Different operations may be offloaded and performed by other dedicated hardware components. For example, in at least one embodiment, compression processing may not be performed by the nodes and may be offloaded and performed by a compression hardware component. In at least one embodiment, each node may include its own dedicated compression hardware component that performs compression processing for the node. Processing may be performed to determine whether offload processing for one of the nodes is overloaded relative to the other peer node. For example, a first measured bandwidth of data sent to the compression hardware component of node A may be compared to a second measured bandwidth of data sent to the compression hardware component of node B. Processing may compare the first measured bandwidth for node A to the second measured bandwidth for node B to determine whether the first measured bandwidth exceeds the second measured bandwidth by at least a specified difference. Responsive to determining the first measured bandwidth exceeds the second measured bandwidth by the specified threshold difference, the criteria may indicate to perform load balancing to dynamically modify and move the optimized or preferred paths of one or more LUNs from node A to node B. The criteria may also indicate that the rebalancing is performed only if the busy node from which workload is shifted from, such as the foregoing busy node A, has at least a minimum measured bandwidth.

An embodiment may include any one or more of the foregoing criteria. An embodiment may require any specified number of one or more of the criteria to be met in order to trigger processing for rebalancing the workload between the nodes. The rebalancing may include dynamically modifying the preferred paths for one or more LUNs from a first busy node determined to be overloaded and/or out of balance relative to the other peer node having a lower workload or activity level. The rebalancing may move the preferred paths for the one or more LUNs from the first busy node to its other peer node having the lower workload.

In addition to load balancing based on the current workload of the nodes, an embodiment in accordance the techniques herein may use a machine learning or other suitable technique to analyze and determine a trend with respect to the I/O load for different LUNs in the system. In such an embodiment, the trend information may be used to pre-emptively and proactively load balance LUNs across the nodes in a predictive manner prior to the point in time when the I/O loads of the LUNs may be expected to change or vary. For example, collected workload information for the LUNs A, B C and D as in the FIGS. 3A and 3B may indicate a particular workload pattern or trend at different times of the day. The LUNs A and B may experience an increased heavy I/O workload as described in connection with the FIGS. 3A and 3B from 5-7 p.m. on weekdays. During the same time period of −5-7 p.m. on weekdays, the LUNs C and D may experience a very low or light workload as described in connection with FIGS. 3A and 3B. Based on the foregoing trend, the I/O workload of LUN A is expected or predicted to have a particular I/O workload level from 5-7 p.m. on weekdays. In at least one embodiment, just prior to 5 p.m., the data storage system may pre-emptively change the preferred and non-preferred path states for the LUN A as described in connection with the FIGS. 3A and 3B. Subsequently the host may be notified by the data storage system regarding the pre-emptive path state changes prior to 5 p.m.

In this manner, the path state changes may be made prior to the predicted or expected workload pattern based on the detected workload trend.

Figure 4:
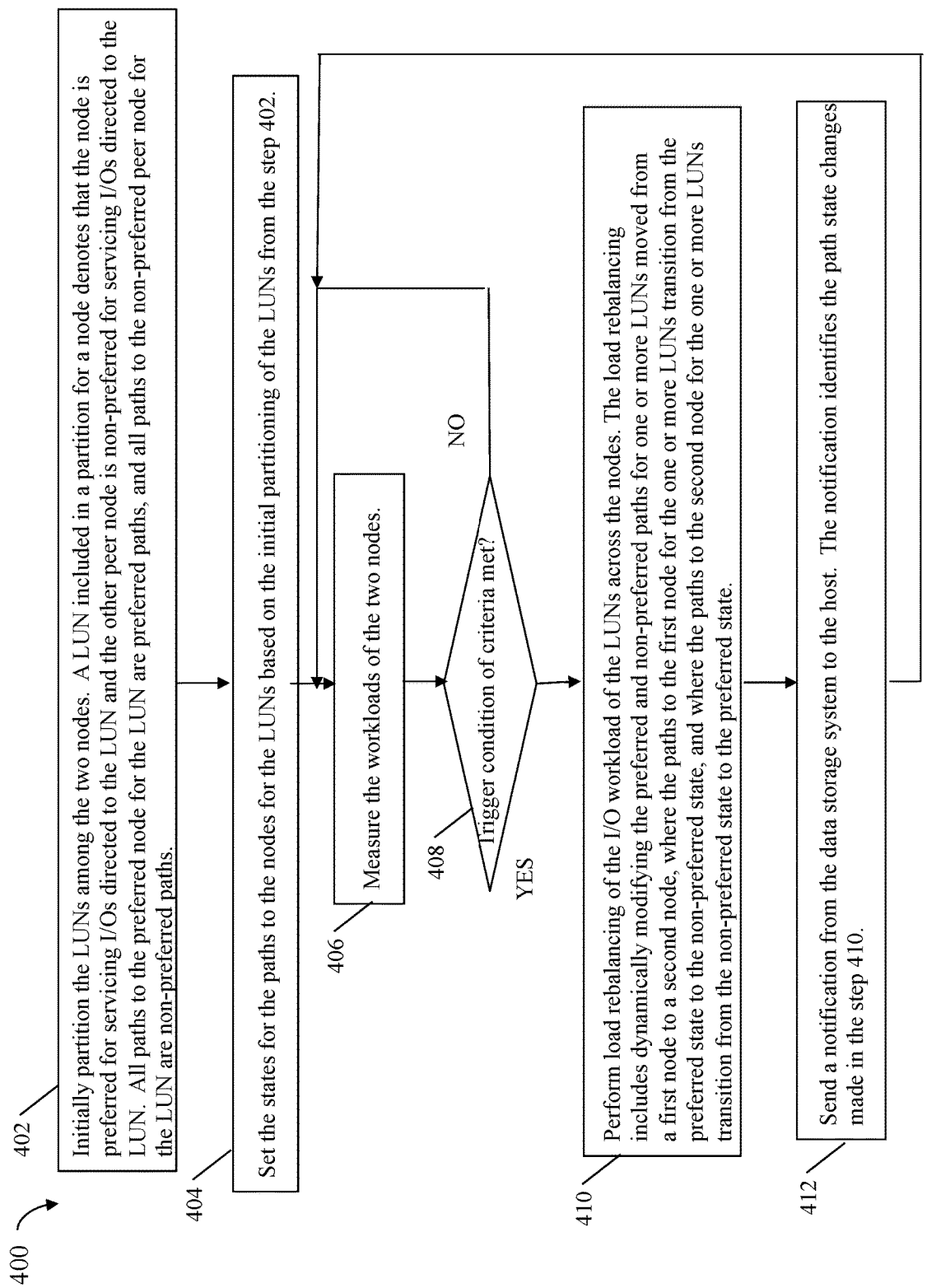
FIG. 4 is a flowchart of processing steps that may be performed in an embodiment in accordance with the techniques herein.

Referring to FIG. 4, shown is a flowchart 400 of processing steps that may be performed in an embodiment in accordance with the techniques herein. The flowchart 400 summarized processing described above.

At the step 402, processing may be performed to initially partition the LUNs among the two nodes. A LUN included in a partition for a node denotes that the node is preferred for servicing I/Os directed to the LUN and the other peer node is non-preferred for servicing I/Os directed to the LUN. All paths to the preferred node for the LUN are preferred paths, and all paths to the non-preferred peer node for the LUN are non-preferred paths. From the step 402, control proceeds to the step 404.

At the step 404, processing may be performed by the data storage system to set the states for the paths to the nodes for the LUNs based on the initial partitioning of the LUNs from the step 402. From the step 404, control proceeds to the step 406. At the step 406, the workloads of the two nodes may be measured. From the step 406, control proceeds to the step 408.

In at least one embodiment, the processing of measuring the workloads of the nodes in the step 406 may be commenced periodically such as at each occurrence of a defined time interval. In such an embodiment, performing to the step 406 may include waiting until the next occurrence of the defined time interval and while waiting, measuring the workloads of the two nodes. Once the next occurrence of the defined time interval has elapsed, control proceeds from the step 406 to the step 408.

At the step 408, a determination is made as to whether a trigger condition of the specified criteria is met. If the step 408 evaluates to no, control proceeds to the step 406. If the step 408 evaluates to yes, control proceeds to the step 410.

At the step 410, load rebalancing of the I/O workload of the LUNs across the nodes is performed. The load rebalancing includes dynamically modifying the preferred and non-preferred paths for one or more LUNs moved from a first node to a second node, where the paths to the first node for the one or more LUNs transition from the preferred state to the non-preferred state, and where the paths to the second node for the one or more LUNs transition from the non-preferred state to the preferred state. From the step 410, control proceeds to the step 412.

At the step 412, a notification is sent from the data storage system to the host. The notification identifies the path state changes made in the step 410. From the step 412, control proceeds to the step 406.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method for workload balancing by dynamically modifying path states comprising:

determining, using one or more processors, first path state information for a first group of logical devices, wherein the first path state information indicates that a first set of paths from a host to a first target port group of a first node in a data storage system are preferred paths for the first group of logical devices and wherein the first path state information indicates that a second set of paths from the host to a second target port group of a second node of the data storage system are non-preferred paths for the first group of logical devices;

determining, using said one or more processors, second path state information for a second group of logical devices, wherein the second path state information indicates that the first set of paths from the host to the first target port group of the first node in a data storage system are non-preferred paths for the second group of logical devices and wherein the second path state information indicates that the second set of paths from the host to the second target port group of the second node of the data storage system are preferred paths for the second group of logical devices;

measuring, using said one or more processors, a first workload of the first node and a second workload of the second node, wherein said measuring includes:

measuring one or more node resource utilization metrics, including a first CPU utilization, of the first node; and measuring the one or more node resource utilization metrics, including a second CPU utilization, of the second node;

determining, using said one or more processors and in accordance with one or more criteria, to perform load rebalancing of the first workload of the first node and the second workload of the second node, wherein said load rebalancing includes dynamically changing one or more preferred paths for one or more logical devices of the first group of logical devices from the first node to the second node, wherein the one or more criteria includes a first trigger condition, and wherein said determining to perform load rebalancing includes:

determining that the first trigger condition is met where the first workload of the first node is determined to be overloaded and where there is a first workload imbalance between the first node and the second node, wherein the first workload imbalance is detected by the first CPU utilization of the first workload of the first node exceeding the second CPU utilization of the second workload of the second node by at least a specified amount, and wherein the first node being overloaded is detected by the first CPU utilization of the first workload of the first node exceeding a specified maximum threshold;

performing, by the data storage system using said one or more processors, said load rebalancing, including:

selecting the first logical device of the first group of logical devices;

modifying a current state for the first set of paths to the host for the first logical device from preferred to non-preferred; and modifying a current state for the second set of paths to the host for the first logical device from non-preferred to preferred;
responsive to said load rebalancing, the data storage system sending a notification to the host, wherein said notification includes information identifying one or more preferred paths changed from the first node to the second node for one or more logical devices including a first logical device of the first group;
the host sending I/Os directed to the first logical device over a first preferred path in accordance with the information of the notification sent by the data storage system responsive to said load rebalancing, wherein the first CPU utilization for the first node and the second CPU utilization for the second node are included in first workload information obtained at a first point in time;
predicting, based on the first workload information from the first point in time, a second point in time when a third workload of the first node is expected to be overloaded and when there is expected to be a second workload imbalance between the first node and the second node, wherein the second workload imbalance expected at the second point in time includes a third CPU utilization of the third workload of the first node exceeding a fourth CPU utilization of a fourth workload of the second node by at least the specified amount, and wherein the first node expected to be overloaded at the second point in time is due to the third CPU utilization of the third workload of the first node at the second point in time exceeding the specified maximum threshold; and
responsive to said predicting, the data storage system pre-emptively performing second load rebalancing prior to the second point in time, including the data storage system sending a second notification to the host, wherein said second notification includes second information identifying second one or more preferred paths changed from the first node to the second node for one or more logical devices.

2. The method of claim 1, wherein the one or more node resource utilization metrics include one or more one or more metrics regarding any of: memory utilization, cache utilization, and resource utilizations for data services.

3. The method of claim 1, wherein the first logical device selected has a highest current I/O workload of all logical devices of the first group.

4. The method of claim 1, wherein the notification identifies a first modification of a current state for the first logical device for the first set of paths to the host from preferred to non-preferred, and wherein the notification identifies a second modification of a current state for the first logical device for the second set of paths to the host from non-preferred to preferred.

5. The method of claim 1, further comprising:
receiving, by the host, the first path information and the second path information, wherein a multipath driver on the host uses the first path state information and the second path state information to select a path for sending I/O operations to logical devices of the first group and the second group.

6. The method of claim 5, wherein prior to performing said load rebalancing, the multipath driver sends a first I/O operation directed to the first logical device of the first group of logical devices over a first path that is included in the first set of paths and that is indicated by the first path state information as a preferred path for the first logical device.

7. The method of claim 6, further comprising:
determining by the multipath driver that no preferred path between the host and the data storage system for the first logical device is active; and
responsive to determining that no preferred path between the host and the data storage system for the first logical device is active, sending a second I/O operation to the first logical device over a second path that is included in the second set of paths and that is indicated by the first path state information as a non-preferred path between the host and the second node of the data storage system for the first logical device.

8. The method of claim 1, wherein the first group of logical devices and the second group of logical devices are included in a collective group, and where the method further comprises: initially partitioning the collective group of logical devices into the first group and the second group.

9. The method of claim 1, wherein said measuring includes:
measuring one or more performance metrics of the first node; and
measuring the one or more node performance metrics of the second node, wherein the one or more performance metrics include one or more of: a back-end access time or back-end I/O rate in connection with accessing data stored on back-end non-volatile storage of the data storage system, an average I/O response time, and an offload processing bandwidth metric.

10. The method of claim 1, wherein said sending the notification is initiated by the data storage system in response to said load rebalancing without receiving a request from the host for the information included in the notification.

11. A system for workload balancing by dynamically modifying path states, comprising:
one or more processors; and
a memory comprising code stored thereon that, when executed, performs a method of determining path states comprising:
determining first path state information for a first group of logical devices, wherein the first path state information indicates that a first set of paths from a host to a first target port group of a first node in a data storage system are preferred paths for the first group of logical devices and wherein the first path state information indicates that a second set of paths from the host to a second target port group of a second node of the data storage system are non-preferred paths for the first group of logical devices;
determining second path state information for a second group of logical devices, wherein the second path state information indicates that the first set of paths from the host to the first target port group of the first node in a data storage system are non-preferred paths for the second group of logical devices and wherein the second path state information indicates that the second set of paths from the host to the second target port group of the second node of the data storage system are preferred paths for the second group of logical devices;
measuring a first workload of the first node and a second workload of the second node, wherein said measuring includes:
measuring one or more node resource utilization metrics, including a first CPU utilization, of the first node; and
measuring the one or more node resource utilization metrics, including a second CPU utilization, of the second node;

determining, in accordance with one or more criteria, to perform load rebalancing of the first workload of the first node and the second workload of the second node, wherein said load rebalancing includes dynamically changing one or more preferred paths for one or more logical devices of the first group of logical devices from the first node to the second node, wherein the one or more criteria includes a first trigger condition, and wherein said determining to perform load rebalancing includes:
  determining that the first trigger condition is met where the first workload of the first node is determined to be overloaded and where there is a first workload imbalance between the first node and the second node, wherein the first workload imbalance is detected by the first CPU utilization of the first workload of the first node exceeding the second CPU utilization of the second workload of the second node by at least a specified amount, and wherein the first node being overloaded is detected by the first CPU utilization of the first workload of the first node exceeding a specified maximum threshold;
performing, by the data storage system, said load rebalancing, including:
  selecting the first logical device of the first group of logical devices;
  modifying a current state for the first set of paths to the host for the first logical device from preferred to non-preferred; and
  modifying a current state for the second set of paths to the host for the first logical device from non-preferred to preferred;
responsive to said load rebalancing, the data storage system sending a notification to the host, wherein said notification includes information identifying one or more preferred paths changed from the first node to the second node for one or more logical devices including a first logical device of the first group;
the host sending I/Os directed to the first logical device over a first preferred path in accordance with the information of the notification sent by the data storage system responsive to said load rebalancing, wherein the first CPU utilization for the first node and the second CPU utilization for the second node are included in first workload information obtained at a first point in time;
predicting, based on the first workload information from the first point in time, a second point in time when a third workload of the first node is expected to be overloaded and when there is expected to be a second workload imbalance between the first node and the second node, wherein the second workload imbalance expected at the second point in time includes a third CPU utilization of the third workload of the first node exceeding a fourth CPU utilization of a fourth workload of the second node by at least the specified amount, and wherein the first node expected to be overloaded at the second point in time is due to the third CPU utilization of the third workload of the first node at the second point in time exceeding the specified maximum threshold; and
responsive to said predicting, the data storage system pre-emptively performing second load rebalancing prior to the second point in time, including the data storage system sending a second notification to the host, wherein said second notification includes second information identifying second one or more preferred paths changed from the first node to the second node for one or more logical devices.

12. A non-transitory computer readable medium comprising code stored thereon that, when executed, performs a method for workload balancing by dynamically modifying path states comprising:
  determining first path state information for a first group of logical devices, wherein the first path state information indicates that a first set of paths from a host to a first target port group of a first node in a data storage system are preferred paths for the first group of logical devices and wherein the first path state information indicates that a second set of paths from the host to a second target port group of a second node of the data storage system are non-preferred paths for the first group of logical devices;
  determining second path state information for a second group of logical devices, wherein the second path state information indicates that the first set of paths from the host to the first target port group of the first node in a data storage system are non-preferred paths for the second group of logical devices and wherein the second path state information indicates that the second set of paths from the host to the second target port group of the second node of the data storage system are preferred paths for the second group of logical devices;
  measuring a first workload of the first node and a second workload of the second node, wherein said measuring includes:
    measuring one or more node resource utilization metrics, including a first CPU utilization, of the first node; and
    measuring the one or more node resource utilization metrics, including a second CPU utilization, of the second node;
  determining, in accordance with one or more criteria, to perform load rebalancing of the first workload of the first node and the second workload of the second node, wherein said load rebalancing includes dynamically changing one or more preferred paths for one or more logical devices of the first group of logical devices from the first node to the second node, wherein the one or more criteria includes a first trigger condition, and wherein said determining to perform load rebalancing includes:
    determining that the first trigger condition is met where the first workload of the first node is determined to be overloaded and where there is a first workload imbalance between the first node and the second node, wherein the first workload imbalance is detected by the first CPU utilization of the first workload of the first node exceeding the second CPU utilization of the second workload of the second node by at least a specified amount, and wherein the first node being overloaded is detected by the first CPU utilization of the first workload of the first node exceeding a specified maximum threshold;
  performing, by the data storage system, said load rebalancing, including:
    selecting the first logical device of the first group of logical devices;
    modifying a current state for the first set of paths to the host for the first logical device from preferred to non-preferred; and
    modifying a current state for the second set of paths to the host for the first logical device from non-preferred to preferred;

responsive to said load rebalancing, the data storage system sending a notification to the host, wherein said notification includes information identifying one or more preferred paths changed from the first node to the second node for one or more logical devices including a first logical device of the first group;

the host sending I/Os directed to the first logical device over a first preferred path in accordance with the information of the notification sent by the data storage system responsive to said load rebalancing, wherein the first CPU utilization for the first node and the second CPU utilization for the second node are included in first workload information obtained at a first point in time;

predicting, based on the first workload information from the first point in time, a second point in time when a third workload of the first node is expected to be overloaded and when there is expected to be a second workload imbalance between the first node and the second node, wherein the second workload imbalance expected at the second point in time includes a third CPU utilization of the third workload of the first node exceeding a fourth CPU utilization of a fourth workload of the second node by at least the specified amount, and wherein the first node expected to be overloaded at the second point in time is due to the third CPU utilization of the third workload of the first node at the second point in time exceeding the specified maximum threshold; and responsive to said predicting, the data storage system pre-emptively performing second load rebalancing prior to the second point in time, including the data storage system sending a second notification to the host, wherein said second notification includes second information identifying second one or more preferred paths changed from the first node to the second node for one or more logical devices.

13. The non-transitory computer readable medium of claim 12, wherein the one or more node resource utilization metrics include one or more one or more metrics regarding any of: memory utilization, cache utilization, and resource utilizations for data services.

14. The non-transitory computer readable medium of claim 12, wherein the first logical device selected has a highest current I/O workload of all logical devices of the first group.

* * * * *